(12) United States Patent
Welch et al.

(10) Patent No.: US 6,837,509 B2
(45) Date of Patent: Jan. 4, 2005

(54) MOTORCYCLE GUARD PROTECTION SYSTEM

(76) Inventors: Jim Welch, 2736 Bluegrass Dr., Fort Collins, CO (US) 80526; William T. Alexander, 425 Mule Deer Dr., Loveland, CO (US) 80537

( * ) Notice: Subject to any disclaimer, the term of this patent is extended or adjusted under 35 U.S.C. 154(b) by 0 days.

(21) Appl. No.: 10/236,554

(22) Filed: Sep. 5, 2002

(65) Prior Publication Data

US 2004/0046359 A1 Mar. 11, 2004

(51) Int. Cl.[7] ............................................. B62J 23/00
(52) U.S. Cl. ..................... 280/304.3; 180/219; 280/770; 280/850; D12/126; D12/117
(58) Field of Search .............................. 280/770, 304.3, 280/304.5, 850, 848, 152.3; 180/219; 296/78.1; 74/608; D12/107, 117, 115, 119, 126

(56) References Cited

U.S. PATENT DOCUMENTS

| | | | | |
|---|---|---|---|---|
| 629,667 A | * | 7/1899 | Denbigh | 280/304.3 |
| 4,105,220 A | * | 8/1978 | Pacific | 280/304.4 |
| 4,136,890 A | * | 1/1979 | Vertucci | 296/78.1 |
| 4,138,132 A | * | 2/1979 | Doyle | 280/304.3 |
| 4,878,558 A | * | 11/1989 | Asakura | 180/219 |
| D313,774 S | * | 1/1991 | Hauer | D12/126 |
| 5,397,146 A | * | 3/1995 | Fischer | 280/288.4 |
| 6,419,039 B1 | * | 7/2002 | Wagner | 180/219 |

* cited by examiner

*Primary Examiner*—Lesley D. Morris
*Assistant Examiner*—Tony Winner
(74) *Attorney, Agent, or Firm*—Santangelo Law Offices, P.C.

(57) ABSTRACT

A protector system configured to engage a portion of the exterior surface of tubular components of a motorcycle, such as engine guard(s), saddlebag guard(s), handle bars, to provide a surface deposed to prevent or minimize damage of such tubular components resulting from impact or to alter transmission of impact or operational forces to such tubular components.

6 Claims, 9 Drawing Sheets

Fig. 1

Prior Art

Fig. 2

Prior Art

MOTORCYCLE GUARD PROTECTION SYSTEM

BACKGROUND

Generally, a protection and force transmission alteration system applied to the tubular components of a motorcycle. Specifically, a motorcycle engine guard or saddlebag guard protection system that may be used to minimize or prevent damage to the guards when the motorcycle lies on its side.

Motorcycles can receive and transmit high energy operational and impact forces. For example, when a motorcycle falls on its side the cost to repair the various parts that may be damaged can run into the thousands of dollars. To prevent or minimize damage to expensive components of the motorcycle that extend outwardly from the longitudinal centerline of the motorcycle, such as engine components, saddlebags, footboards, handlebars, levers, clutch pedals, brake pedals, or the like, various types of guards have been manufactured which connect to the motorcycle frame and extend outwardly beyond these components to receive the operational or impact forces generated between the motorcycle and other surfaces as described by U.S. Pat. Nos. 6,068,075 and 6,234,266, which are incorporated by reference contained herein.

A significant problem with conventional guards for motorcycles can be that the tubular components from which they are made are substantially inflexible, although the guards may bend under extreme force, the guards have little compressibility, elasticity, or resiliency. As such, these guards can transmit undesired operational and impact forces to the main frame of the motorcycle and to the rider.

Another significant problem with conventional guards for motorcycles can be that for appearance the guards may be metal plated, brushed, or otherwise have the exterior surface finished in a manner that appeals to the rider. Even slight impact, such as the motorcycle falling on its side, can cause sufficient damage to the guard(s) to warrant replacement of the guard. Replacement of the guard can be expensive or time consuming.

Another significant problem with conventional guards for motorcycles may be that the portion of the outwardly extending motorcycle engine guard(s) or saddlebag guard(s) most likely to contact other surfaces is arcuate or curved and protectors for arcuate or curved tubular components may not be available.

Yet another problem with the frame assemblies of motorcycles can be that they transmit undesired characteristics of operational or impact forces through the frame assembly of the motorcycle. The transmission of these forces as undesired frequencies or amplitudes can reduce the level of rider control or comfort and may cause damage to the motorcycle frame or other motorcycle components.

SUMMARY OF THE INVENTION

Accordingly, the objects of the motorcycle guard protection system described herein addresses each of these problems in a practical manner.

A broad object of the invention can be to provide a protector for tubular components that make up the main frame assembly, the front fork assembly, or rear fork assembly of a motorcycle, or the like.

Another object of the invention can be to provide a protector for engine guard(s) of various types of motorcycles to protect the exterior surface of such engine guard(s) when the motorcycle tips over or lies on its side.

Another object of the invention can be to provide a protector for the saddlebag guard(s) of various types of motorcycles to protect the exterior surface of such saddlebag guard(s) when the motorcycle tips over on its side.

Another object of the invention can be to provide a rigid protector configured to engage the exterior surfaces of arcuate or curved tubular components.

Another object of the invention can be to provide a motorcycle guard protection system specifically for Harley Davidson motorcycles to protect the exterior surfaces of the engine guard(s) or the saddlebag guard(s).

Another significant object of the invention may be to alter, adjust, or standardize the transmission of force(s) between the support surface(s) to which the motorcycle responds and the main frame assembly, the front fork, the rear fork, or the rider. One aspect of this object may be to provide rider(s) with greater control of the motorcycle. Another aspect of this object may be to provide a motorcycle having a more desirable feel with respect to auditory or tactile cues.

Further objects of the invention will become apparent from the description and drawings below.

DETAILED DESCRIPTION OF THE PREFERRED EMBODIMENTS

A protector system configured to engage a portion of the exterior surface of tubular components of a motorcycle, such as engine guard(s), saddlebag guard(s), handle bars, or the like, to provide a surface deposed to prevent or minimize damage of such tubular components resulting from impact or operational forces, or to alter the characteristics of such impact or operational forces transmitted to such tubular components.

Hereinafter, several embodiments of the protector invention will be described with reference to the accompanying drawings. While these embodiments of the invention provide specific examples of the protector system configured to protect the engine guard(s) or saddlebag guard(s) of various types of motorcycles, these examples are not meant to limit the scope of the invention to these particular types of motorcycles or portions of such motorcycles, or to the tubular configurations shown or described, but rather are intended be illustrative of the varied and numerous applications in which the invention can be used to protect the tubular components of motorcycles.

Motorcycles that can be protected in accordance with the invention can include as examples, but are not limited to, Harley-Davidson, Honda, Kawasaki, Suzuki, BMW, Yamaha, whether customized or as distributed by the respective manufacturers.

Figure 1:
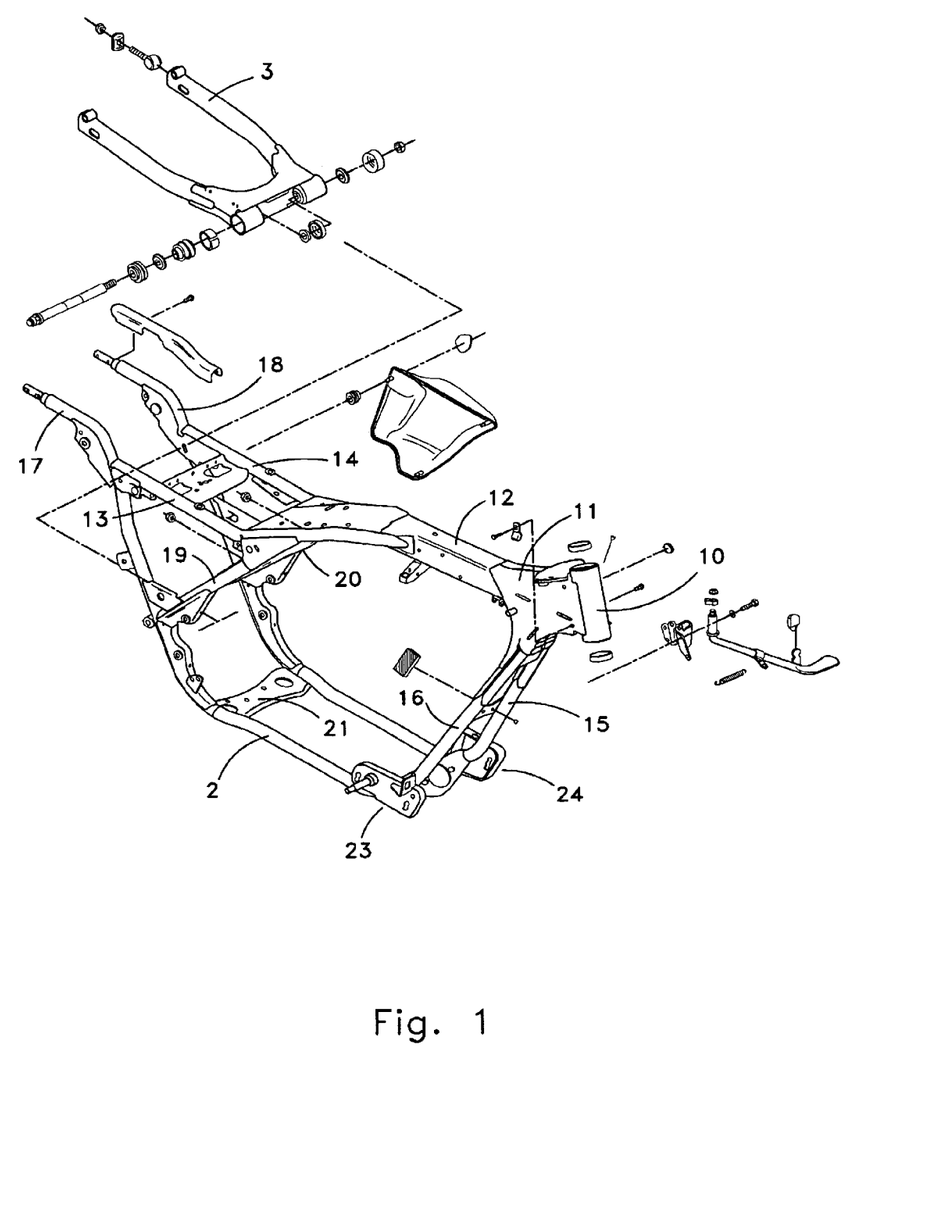
FIG. 1 shows an exploded view of a tubular frame of a motorcycle with which certain embodiments of the invention can be used.

Now referring primarily to FIG. 1, motorcycles (1) (see also FIG. 4) with which the invention may be used typically have a main frame assembly (2) to which a rear fork assembly (3) and a front fork assembly (4) can be made rotationally responsive. As can be understood, the main frame assembly (2), rear fork assembly (3), and front fork assembly (4) can be made using a variety of tubular components and a variety of sheet components that when assembled provide the desired configuration to which the engine (5), power transmission assembly (6), steering assembly (7), front wheel (8), rear wheel (9), or other components are secured. While the tubular components as shown in FIG. 1 are substantially circular in perpendicular cross section, the tubular components selected for the main frame assembly (2) can be in perpendicular cross section any polygon, for example, square, pentagonal, hexagonal, or the like; or circular or ovoid; or can be in certain circumstance beams, which in perpendicular cross section may be I or L beams, or the like.

The main frame assembly (2) can comprise, as but one example, a head pipe (10) to which a gusset (11) can be connected. A forward main frame (12) connected to the head pipe (10) or gusset (11) extends rearwardly. A right seat rail (13) and a left seat rail (14) attach obliquely to the forward main frame (12) one on each side and extend rearwardly. Down-frames (15)(16) also connect to the gusset (11) or head pipe (10) and extend downwardly and rearwardly expanding both left and right of the longitudinal centerline of the main frame assembly (2) having sufficient curvature to extend rearwardly and then upwardly each then connecting to one of two corresponding seat rails (13)(14). The down-frames (15)(16) may further curve to extend rearwardly for a distance to provide a pair of rear frames (17)(18). Reinforcing tubes (19)(20) connect between the upward portion of the down-frames (15)(16) and the seat rails (13)(14). Cross member(s)(21), gussets, or the like, of various configurations can be connected to stiffen or reinforce the main frame assembly (2), as necessary or desired.

While FIG. 1 shows an exploded view of a particular model of motorcycle main frame assembly (2) and rear fork assembly (3), it is intended that this particular configuration of main frame assembly (2) be illustrative of the various tubular main frame assemblies, constructs, or configurations made or distributed by various manufacturers with which embodiments of the invention can be used.

Figure 2:
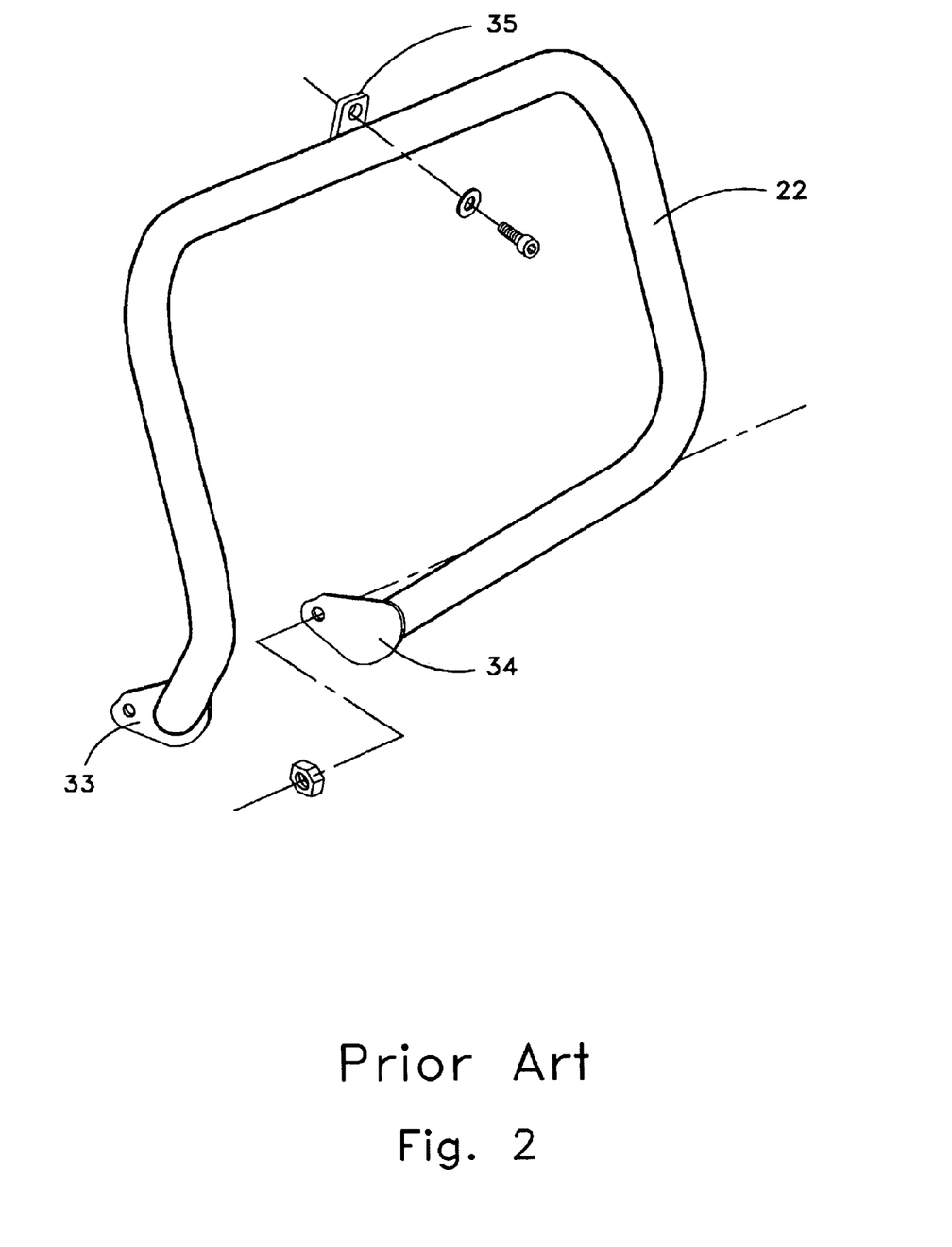
FIG. 2 shows an exploded view of a tubular frame of an engine guard that can be installed to the tubular frame of a motorcycle with which embodiments of the invention can be used.

Now referring primarily to FIG. 2, an engine guard (22) can be joined to the main frame assembly (2). On main frame assemblies configured in a manner similar to that shown by FIG. 1, the engine guard (22) can be joined to the main frame assembly (2) below the head pipe (10) between the down-frames (15)(16) and at the lower portion of the down-frames (15)(16) at the front end of the main frame assembly (2). The engine guard (22) typically extends out from the longitudinal centerline of the main frame assembly (2) a distance sufficient to support the motorcycle (1) without the engine (5) contacting the support surface (23) when the motorcycle (1) is turned on its side.

As such, depending on the configuration of the main frame assembly (2) and the configuration of the engine (5) within the main frame assembly (2), the engine guard (22) can have varied and numerous configurations which can be protected in accordance with the invention.

Figure 3:
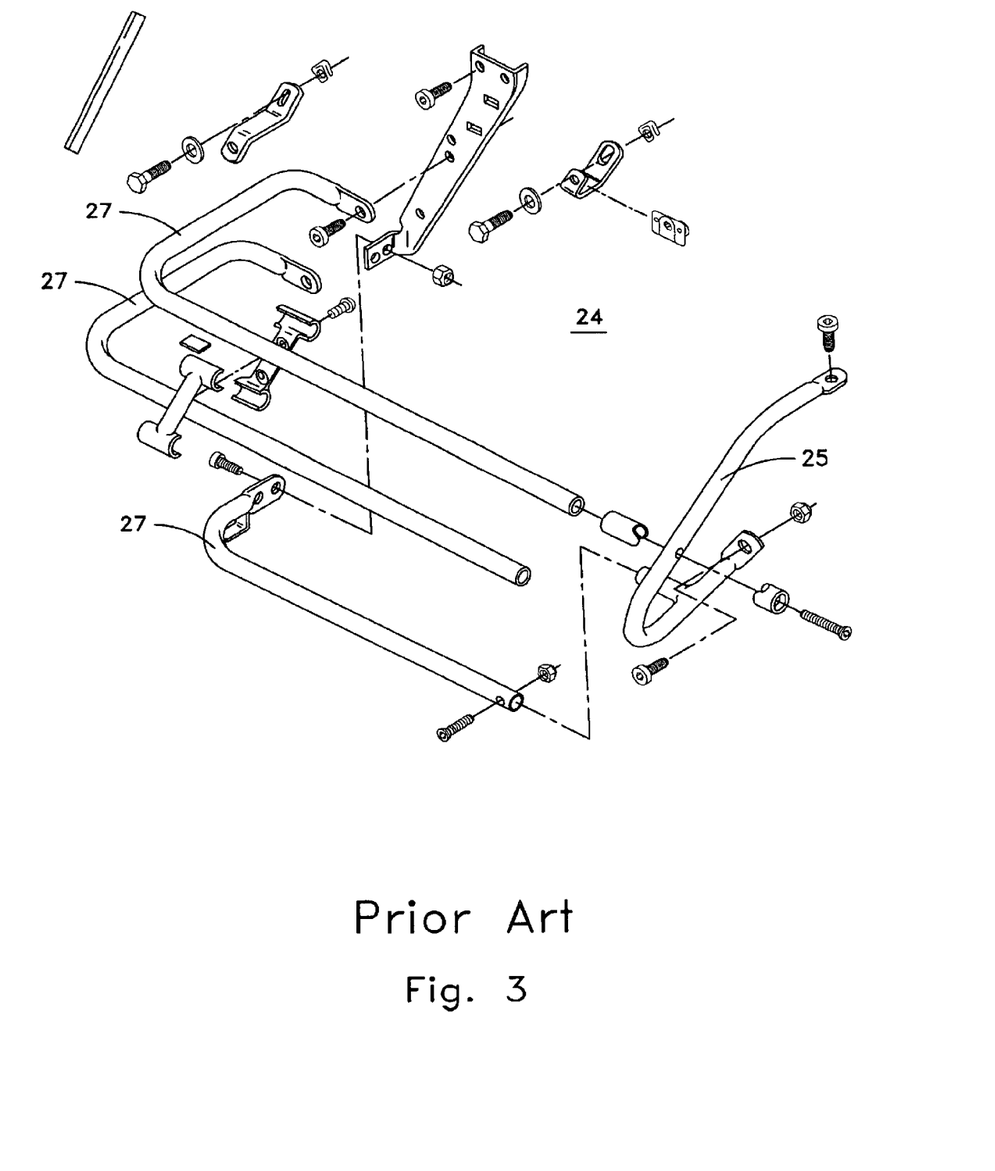
FIG. 3 shows an exploded view of a tubular frame of a motorcycle saddlebag guard that can be installed to the tubular frame of a motorcycle with which embodiments of the invention can be used.

Now referring primarily to FIG. 3, a saddlebag guard (24) can be further connected to the main frame assembly (2) on one side or both sides. Saddlebag guard(s) (24) for motorcycles (1) can be made of tubular components as described above, or as shown by the exploded view of a particular type of saddlebag guard (24) in FIG. 3.

Figure 4:
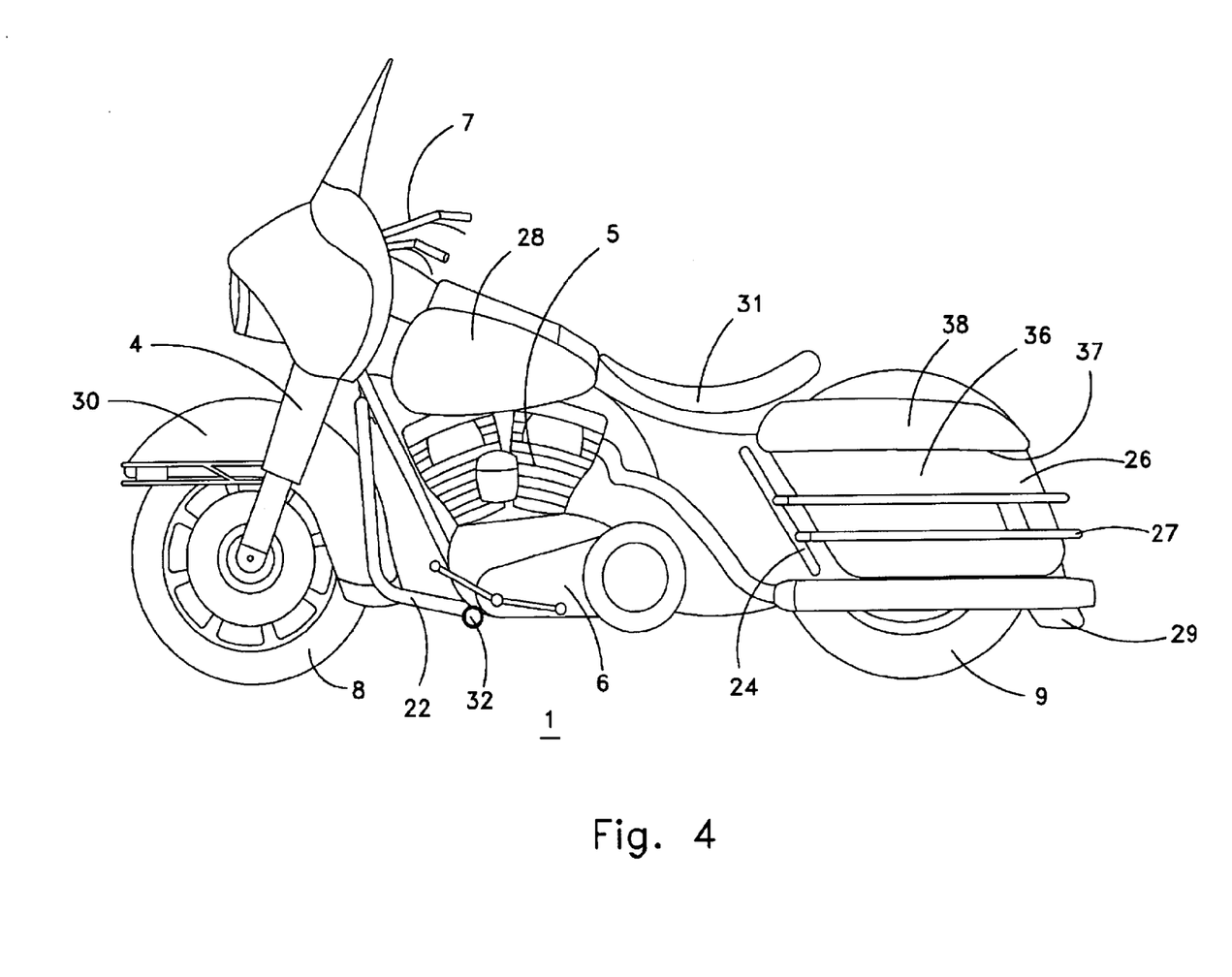
FIG. 4 shows a side view of particular model of motorcycle having an engine guard and a saddlebag guard attached with which particular embodiments of the invention can be used.

Saddlebag guard(s) (24) can be configured as a single tubular component outwardly extending from the main frame assembly (2). The saddlebag guard (24) may extend from the centerline of the main frame assembly (2) a distance sufficient to support the motorcycle (1) without the saddlebag (26) contacting the support surface (23) when the motorcycle (1) is turned on its side. Alternately, as shown by FIG. 3 and FIG. 4, the saddlebag guard (24) can comprise a saddlebag frame (27) including additional tubular components. Numerous and varied configurations of saddlebag guard(s) (24) or saddlebag frames (27) can be used depending upon the external dimensions of the saddlebag (26).

Now referring primarily to FIG. 4, which shows the entire construction of a particular type of motorcycle. A fuel tank (28) can be mounted in such a manner as to stride over the front main frame (12). A rear fender (29) can be mounted to the rear frames (17)(18) or the seat rails (13)(14) and a front fender (30) can be mounted on the front fork assembly (4). A seat (31) can be supported on the seat rails (13)(14). A front wheel (8) can be rotatably mounted between the front fork assembly (4) and a rear wheel (9) can be rotatably mounted in the rear fork assembly (3).

An engine (5) or power unit can be mounted in a space surrounded by the main frame assembly (2). Power from the engine can be transmitted to the rear wheel through a power transmission assembly (6). The engine guard (22) can be connected to the main frame assembly (2) as described above and extends sidewardly as shown in FIG. 4 ahead of the foot pegs (32) to provide protection to the engine (5) and main frame assembly (2) should the motorcycle tip over on its side. The engine guard (22) can, with respect to motorcycles, be an inverted U-shape with a first end (33) and a second end (34) secured to the main frame assembly (2) by suitable fasteners (not shown). While the actual configuration can vary from motorcycle to motorcycle, the engine guard (22) may have a total length from the first end (33) to the second end (34) of between about 70 inches and 90 inches and can have an outside diameter of between about 1 inch and about 2 inches. The exterior surface of the engine guard (22) can have a finish, such as plated finish (for example, chrome), or brushed finish (for example, brushed stainless steel or aluminum), or the like. Opposite the first end (33) and the second end (34), a bracket (35) coupled to the engine guard (22) can be used with a mechanical fastener to connect the engine guard (22) the main frame assembly (2).

Saddlebag(s) (26) can comprise a container (36) having an access aperture (37), which in some instances can further include a cover (38) repositioned to allow ingress and egress from the saddlebag (26), can be located adjacent to one or both sides of rear wheel (9). Each saddlebag (26) can be supported by mechanical fasteners to the main frame assembly (2), saddlebag guard (24), or saddlebag frame (27), or a combination thereof. The saddlebag guard (24) can be connected to the main frame assembly (2) by mechanical fasteners or brackets, as described above.

The saddlebag guard (24) can comprises a single sidewise U shape tubular component sidewardly extending in front of the saddlebag having a first end connected to a bracket affixed to one of the rear frames (17)(18) a second end connected to the upwardly extended portion of a corresponding down-frame (15)(16) to provide protection to the saddlebag (26) should the motorcycle tip over on its side. A saddlebag frame (27) can comprise additional tubular components similar to those to those described above, or as shown in FIG. 3, to provide additional protection or support for the saddlebag(s) (26), as desired. Typically, tubular components from which saddlebag guards are made have an outside diameter of between about one-half inch and about one-inch.

Figure 5:
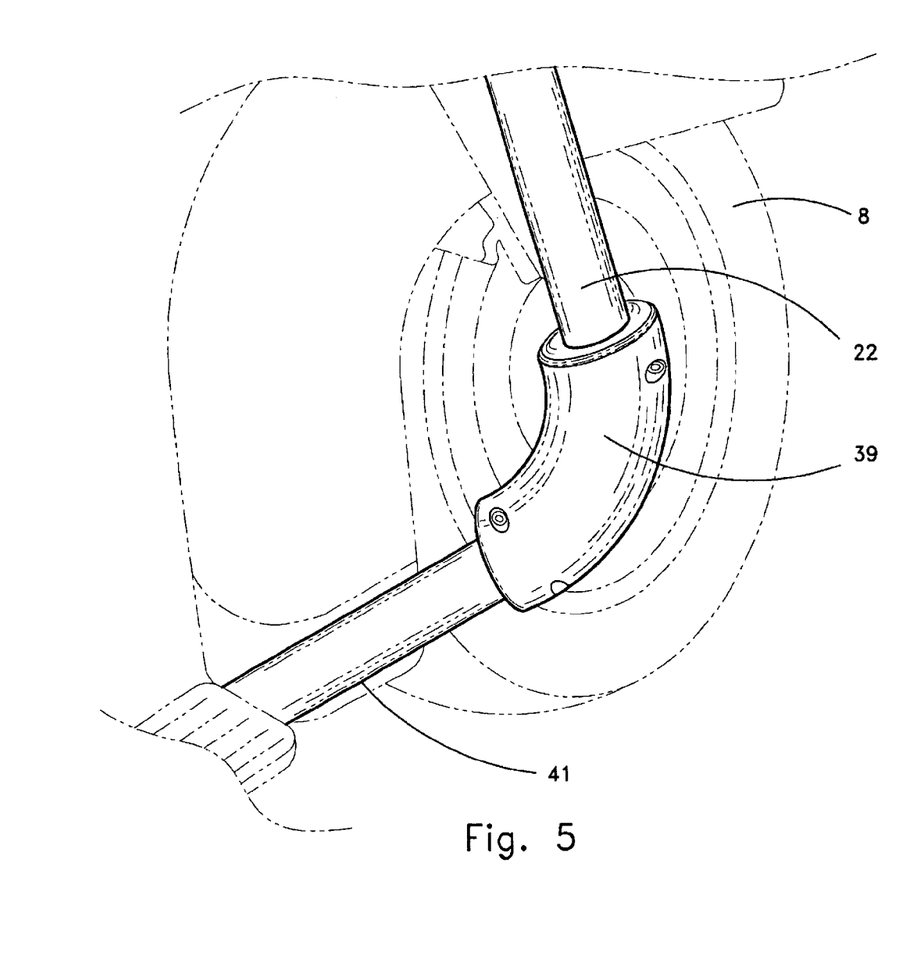
FIG. 5 shows a particular embodiment of the invention protecting a portion of an engine guard.
Figure 6:
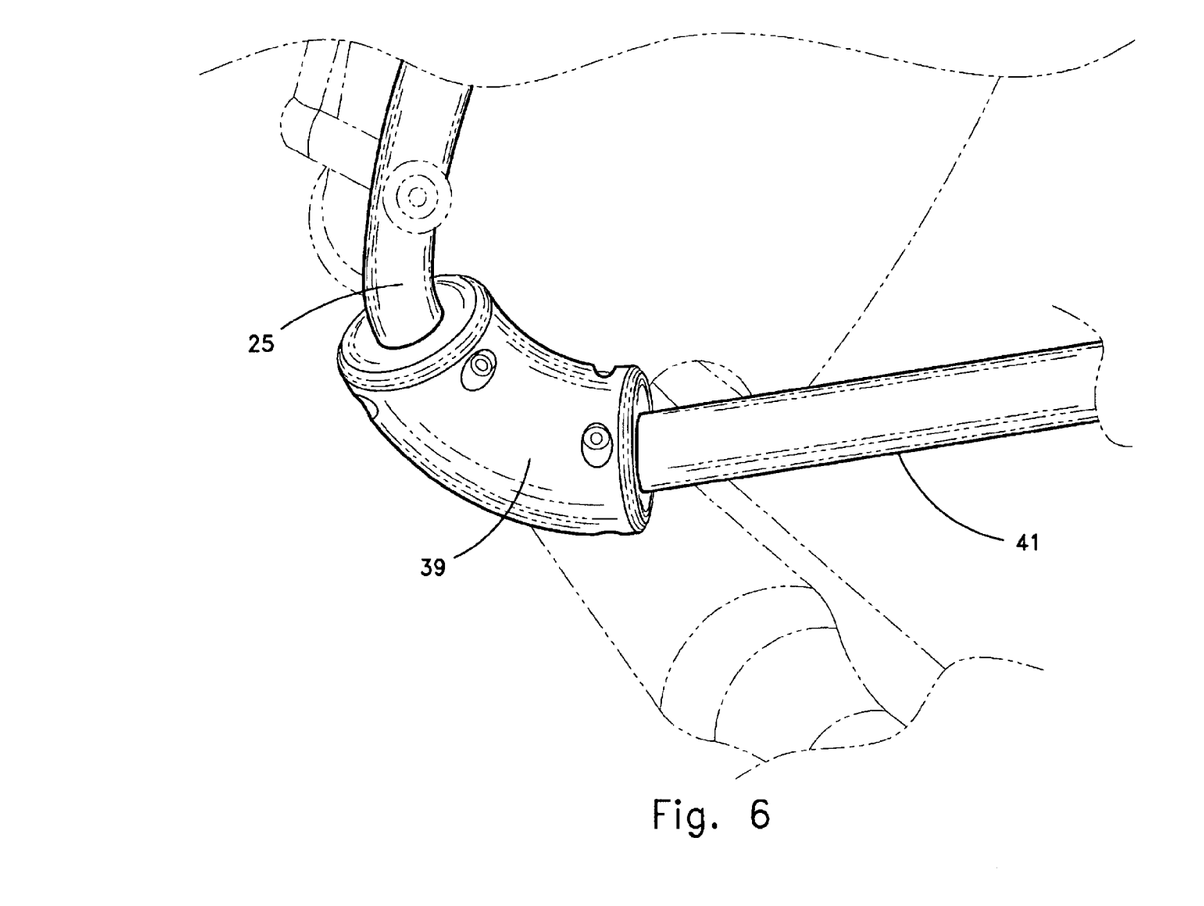
FIG. 6 shows a particular embodiment of the invention protecting a portion of a saddlebag guard.
Figure 8:
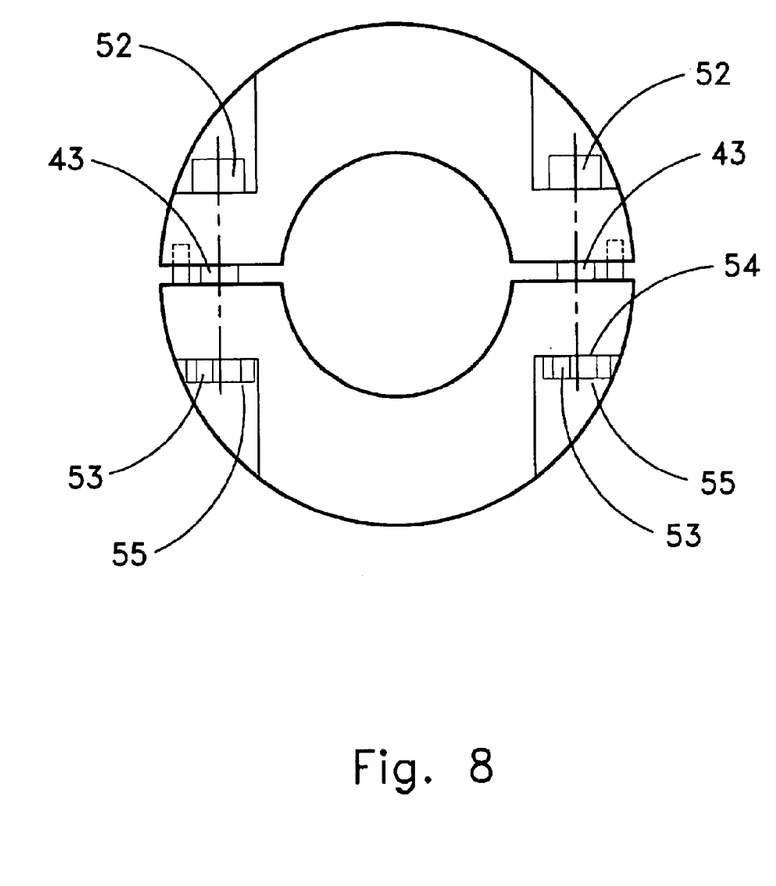
FIG. 8 provides an end view of an embodiment of the invention having two protector elements disposed in opposed mated relation secured by mechanical fasteners.
Figure 9:
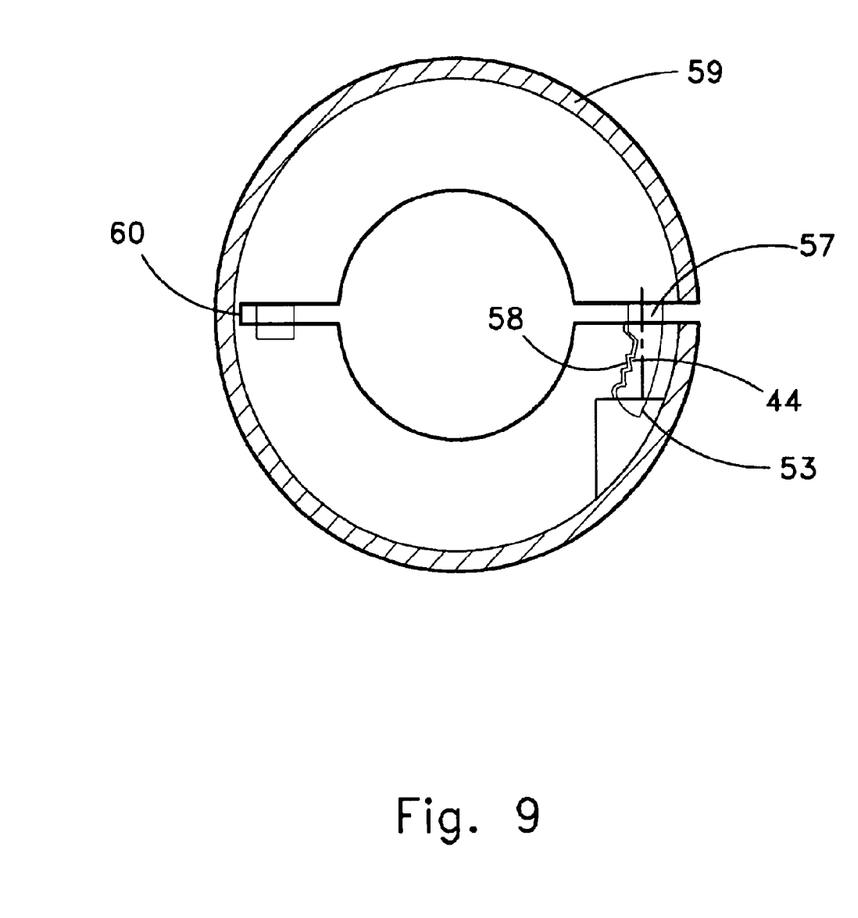
FIG. 9 provides an end view of an embodiment of the invention having two protector elements hinged to provide opposed mated relation secured by a locking member against a locking member engagement surface.

Now referring primarily to FIGS. 5 and 6, an embodiment of the invention can provide a protector (39) for a tubular component(s) of a motorcycle (1). With respect to some embodiments of the invention, the protector (39) can be substantially rigid having an interior surface (40) (examples being shown by FIGS. 7–9) configured to engage a portion of the exterior surface (41) of a tubular component of a motorcycle (1) can be mounted to a portion of the main frame assembly (1), rear fork assembly (3), front fork assembly (4), engine guard (22), or saddlebag guard (24), or the like, as desired. Engagement of the interior surface (40) of the rigid protector (39) can be maintained by operation of a releasable securement (42), such as mechanical fasteners (43) (as shown in FIG. 8, for example) having mated treads, latches, compression bands, or interlocking teeth (44) (as shown in FIG. 9, for example), or the like. Operation of the releasable securement generates sufficient frictional force between the interior surface (40) of the protector (39) and the exterior surface (41) of the tubular component to fix the position of the protector (39) during operation of the motorcycle, or even when the motorcycle tips over allowing contact between the protector (39) and the support surface (23).

Referring now specifically to FIG. 5, an embodiment of the invention comprises a protector (39) that engages a portion of the sidewardly extending engine guard (22) of a motorcycle (1). With respect to the embodiment of the invention shown, the engine guard embodiment of the protector (39) is mounted to a portion of the exterior surface (45) of the engine guard (22) having an arcuate configuration. As such, the interior surface (40) of the engine guard protector (39) has a arcuate configuration that correspondingly engages the exterior arcuate surface of the engine guard (22).

Referring now specifically to FIG. 6, an embodiment of the invention comprises a protector (39) that engages a portion of the sidewardly extending saddlebag guard (24) of a motorcycle (1). With respect to the embodiment of the invention shown, the saddlebag protector (39) again, as in FIG. 5, engages a portion of the exterior surface (46) of the saddlebag guard (24) having arcuate configuration. As such, the interior surface (40) of the saddlebag protector (39) has a arcuate configuration that correspondingly engages the exterior arcuate surface of the saddlebag guard (24).

With respect to other embodiments of the invention the protector may be configured to engage the exterior surface of a substantially straight portion of a tubular component or engage the exterior surface of the numerous types of configurations of tubes or beams as described.

Figures 7, 7A:
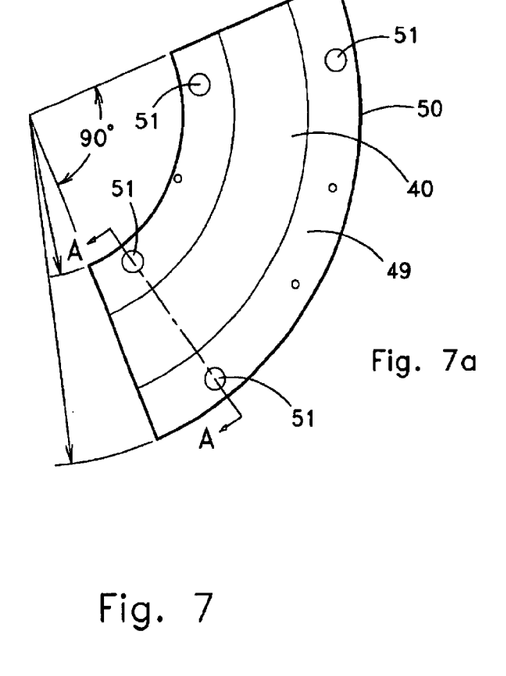
FIG. 7A shows a particular embodiment of the invention in which at least two protector elements can be disposed in opposed relation to protect the surface of a tubular component of a motorcycle.
Figure 7B:
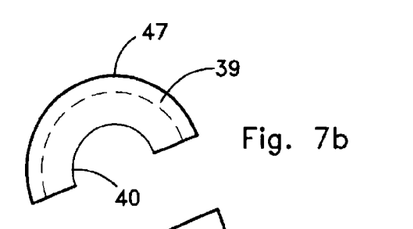
FIG. 7B provides a side view of a particular embodiment of the invention in which at least two protector elements can be disposed in opposed relation to protect the surface of a tubular component of a motorcycle.
Figure 7C:
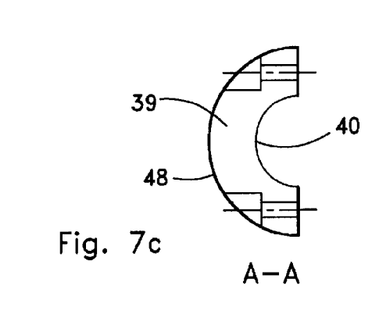
FIG. 7C provides a cross section A—A through of a particular embodiment of the invention in which at least two protector elements can be disposed in opposed relation to protect the surface of a tubular component of a motorcycle.

Now referring primarily to FIG. 7, a particular embodiment of the protector (39) invention can comprise two or more protector elements that operably mate to provide an interior surface to engage the exterior surface of a tubular component. The particular embodiment of the invention shown in FIG. 7 disposes the interior surface (40) of the protector (39) as a first rigid protector element (47) (FIG. 7b) and a second rigid protector element (48) (FIG. 7c) in opposed mated relation. The wall (49) of protector (39) between the protector interior surface (40) and the protector exterior surface (50) can vary in thickness depending upon the application and the type of releasable securement utilized.

The particular embodiment of the invention shown in FIGS. 7 and 8 provides a plurality of bores (51) that communicate between opposing sides of the protector exterior surface (50). Mechanical fasteners providing a first fastener element (52) and a second fastener element (53) (as shown in FIG. 8) having mated securement surfaces (54) (55), such as a bolt and nut having spirally mated threads, can provide releasable securement of the first rigid protector element (47) to the second rigid protector element (48).

In certain embodiments of the invention, the first fastener element (52) can be continuously integral with the rigid protector element (47) or (48). For example, a spiral thread can be included in the bore (51) of one of the rigid protector elements (47)(48). This can be accomplished by machining or molding the protector elements (47)(48) (or more protector elements) and the first fastener element (52) as one piece or can be accomplished by coupling a discrete first fastener element to the rigid protector element.

In other embodiments of the invention, the second fastener element (53) can be continuously integral with the opposing rigid protector element (47) or (48). For example, a threaded stud can be joined to one of the rigid protector elements (47)(48) either by machining or molding the protector element (47) or (48) and the second fastener element (53) as one piece or can be accomplished by coupling a discrete second fastener element to one of the rigid protector elements.

Now referring to FIG. 9, certain embodiments of the invention can provide continuously integral first fastener element (52) and a continuously integral second fastener element (53). As shown, one embodiment of the invention can comprise a lock member (57) and a lock member engagement (58) each continuously integral with the rigid protector elements. In the embodiment of the invention shown, a lock member (57) can be releasably secured to a locking member engagement surface (58) with mated interlocking teeth (44).

As to each of the above described embodiments of the invention having a plurality of protector elements, such as the first protector element (47) and the second protector element (48) described above, the protector elements can be made as discrete protector elements or can be made to some extent continuous or joined together. For example, embodiments of the invention can further comprise a flexure element (60), as shown in FIG. 9, that allows the surfaces of the first protector element (47) and the second protector element (48) to be continuous, or joined, to some extent. In some applications, flexure element (60) may be a hinge element. The degree of flexure between two, or a plurality of protector elements, depends upon the embodiment of the invention and the application in which it is used. As to those embodiments of the invention used to protect substantially straight portion(s) of a tubular component, the amount of flexure accorded the protector (39) need only be sufficient to allow the external diameter of the tubular component to pass within the protector (39) and engage with the interior surface (40) of the protector (39), while embodiments of the invention used to protect an arcuate portion of a tubular component may have to have increased flexure to allow the arcuate portion of the tubular component to pass within the protector (39) and engage with the interior surface (40) of the protector (39).

As to each embodiment of the invention, the protector element(s) (39) can be made from a material in a mold (such as injection molded), machined, or otherwise configured, to provide the various embodiments of invention including, but not limited to, those described above. For example, the protector (39) or the protector elements (47)(48) can be made from materials selected from the group consisting of metal, plastic, high impact plastic, nylon, nylon resin, high impact nylon, or high impact nylon resin, Zytel—ST 801 high impact nylon, natural rubber, polybutadiene, polyisoprene, polyurethane, ethylenepropylene-diene, styrene-butadiene, isobutylene-isoprene, polychloroprene, neoprene, butyl rubber, or Dupont Neoprene GNA, or the like, as desired to withstand impact with the support surface, to alter the movement of the protector in relation to the support surface, or alter the transmission of impact or operational forces through the tubular components.

Moreover as discussed above, the interior surface (40) of the protector (39) can be configured to engage the various external surface configurations that the various types of main frame assemblies (2), rear fork assemblies (3), front fork assemblies (4), engine guard(s) (22), saddlebag guard (s) (24), or the like, may present. The protector invention can be configured to engage the exterior surface of tubular or beam components having a perpendicular cross section consisting of a substantially circular configuration, a substantially oval configuration, a polygonal configuration, a substantially square configuration, a pentagonal configuration, a hexagonal configuration, or the like, as examples.

While the protector invention can be used solely to protect the exterior surface of a tubular component proximate to that portion engaged by the protector (39), it can also be used to spread the forces of impact over a greater area of the exterior surface (41) of the tubular component which can minimize, reduce, or prevent damage that would otherwise occur to the tubular component.

Moreover, the protector invention can be used to reduce or alter the transmission of operational forces, including impact forces, from the support surface (23) through the main frame assembly (2) or from the user to the main frame assembly (2), or both. Force having characteristics delivered from the support surface (23) to the front wheel (8)) or rear wheel (9) can result in transmission of force characteristics that may be undesirable due to frequency or amplitude to the main frame assembly (2) or to the user. Transmitting at least some portion of the undesired force characteristics to the protector can result in alteration of the undesired force characteristics to a more desirable frequency or amplitude.

As to some embodiments of the invention described above, the protector (39) may be made from or further include an elastomeric layer (59) as shown by FIG. 9 to alter force characteristics to other portions of the main frame assembly (2), rear fork assembly (3), front fork assembly (4). In certain embodiments of the invention, substantial portions of the main frame assembly (2), front fork assembly (4), or rear fork (3) assembly may be engaged by protector (39) having force alteration elastomeric layer(s) (59).

By varying the surface area of the main frame assembly (2) engaged with, or unitized with, or made as one piece including the force alteration embodiment of the protector (39), or by varying the shape and thickness of the protector (39) or elastomeric layer(s) (59), various characteristics of the force applied to the main frame assembly (2) may be altered before they are transmitted to other portions of the main frame assembly or the motorcycle user. For example, the amplitude and frequency of oscillations or vibrations which are transmitted by the main frame assembly may be altered or made more uniform, or the amount of flexure of the main frame assembly may be reduced or made more uniform.

The motorcycle guard protection system can be used in accordance with the invention by positioning the interior surface (40) of the protector (39) or protector element (47) or (48) against the exterior surface (41) of the tubular component, beam, or guard. The securement means are adjusted to compress the interior surface (40) of the protector (39) or plurality of protector elements (47)(48) against the exterior surface (41) of the tubular component, beam, or guard until sufficient engagement forces are generated to maintain the position of the protector (39) during operation of the motorcycle (1).

As can be easily understood from the foregoing, the basic concepts of the present invention may be embodied in a variety of ways. It involves both analysis techniques as well as devices to accomplish the appropriate analysis. In this application, the analysis techniques are disclosed as part of the results shown to be achieved by the various devices described and as steps that are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims herein included.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied for support of the claims of this application. It should be understood that any such language changes and broad claiming is herein accomplished. This full patent application is designed to support a patent covering numerous aspects of the invention both independently and as an overall system.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "protector" should be understood to encompass disclosure of the act of "protecting"—whether explicitly discussed or not—and, conversely, were there effectively disclosure of the act of "protecting", such a disclosure should be understood to encompass disclosure of a "protector" and even a "means for protecting." Such changes and alternative terms are to be understood to be explicitly included in the description.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Patent Application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to claim at least: i) each of the protector systems as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed, xi) processes performed with the aid of or on a computer as described throughout the above discussion, xii) a programmable apparatus as described throughout the above discussion, xiii) a computer readable memory encoded with data to direct a computer comprising means or elements which function as described throughout the above discussion, xiv) a computer configured as herein disclosed and described, xv) individual or combined subroutines and programs as herein disclosed and described, xvi) the related methods disclosed and described, xvii) similar, equivalent, and even implicit variations of each of these systems and methods, xviii) those alternative designs which accomplish each of the functions shown as are disclosed and described, xix) those alternative designs and methods which accomplish each of the functions shown as are implicit to accomplish that which is disclosed and described, xx) each feature, component, and step shown as separate and independent inventions, xxi) the various combinations and permutations of each of the above, and xxii) each potentially dependent claim or concept as a dependency on each and every one of the independent claims or concepts presented.

It should be understood that for practical reasons and so as to avoid adding potentially hundreds of claims, the applicant may eventually present claims with initial dependencies only. Support should be understood to exist to the degree required under new matter laws—including but not limited to European Patent Convention Article 123(2) and United States. patent Law 35 U.S.C §132 or other such laws—to permit the addition of any of the various dependencies or other elements presented under one independent claim or concept as dependencies or elements under any other independent claim or concept.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

The claims set forth in this specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A protector for a tubular component of a motorcycle, comprising:
   a. a rigid protector having an interior surface, wherein said interior surface is configured to directly engage a portion of the exterior surface of said tubular component of said motorcycle; and
   b. at least one releasable securement, whereby operation of said at least one releasable securement maintains engagement of said interior surface of said rigid protector to said portion of the exterior surface of said tubular component of said motorcycle, and wherein said at least one releasable securement comprises at least one mechanical fastener having a first fastener element and a second fastener element with operably mated securement surfaces, and wherein said second fastener element is continuously integral with said rigid protector.

2. A protector for a tubular component of a motorcycle, comprising:
   a. a rigid protector having an interior surface, wherein said interior surface is configured to engage a portion of the exterior surface of said tubular component of said motorcycle; and
   b. at least one releasable securement, whereby operation of said at least one releasable securement maintains engagement of said interior surface of said rigid protector to said portion of the exterior surface of said tubular component of said motorcycle, and wherein said at least one releasable securement comprises at least one mechanical fastener having a first fastener element and a second fastener element with operably mated securement surfaces, and wherein said at least one releasable securement comprises a lock member and a lock member engagement each continuously integral with said rigid protector.

3. A protector for a tubular component of a motorcycle, comprising:
   a. a rigid protector having an interior surface, wherein said interior surface is configured to engage a portion of the exterior surface of said tubular component of said motorcycle; and
   b. at least one releasable securement, whereby operation of said at least one releasable securement maintains engagement of said interior surface of said rigid protector to said portion of the exterior surface of said tubular component of said motorcycle, and wherein said rigid protector disposes said interior surface as a first rigid protector element and a second rigid protector element in opposed mated relation, and further comprising a hinge element coupled to said first rigid protector element and to said second rigid protector element, whereby operation of said hinge element allows opposed mated relation with said first protector element.

4. A method of protecting a tubular component of a motorcycle, comprising the steps of:
   a. configuring an interior surface of a rigid protector to directly engage a portion of the exterior surface of said tubular component of said motorcycle, wherein said rigid protector comprises a first protector element and a second protector element disposed in opposed mated relation;
   b. engaging said interior surface of said rigid protector to said portion of said exterior surface; and
   c. releasably securing said rigid protector to said exterior surface of said tubular component of said motorcycle.

5. A method of protecting a tubular component of a motorcycle as described in claim 4, wherein said step of releasably securing said rigid protector to said exterior surface of said tubular component of said motorcycle comprises the steps of:
   i. inserting at least one mechanical fastener into at least one interpenetration element communicating between a first location on the exterior surface of said first protector element and a location on the exterior surface of said second protector element, wherein a portion of said mechanical fastener inserted into said at least one interpenetration element has a securement surface; and
   ii. engaging said portion of said mechanical fastener having said securement surface with a mated securement surface hinge.

6. A method of protecting a tubular component of a motorcycle as described in claim 5, rotating said first protector element and said second protector element about a rotation axis of a hinge.

* * * * *